3,630,953
TAILORED SURFACTANTS FOR USE IN FORMING OIL-IN-WATER EMULSIONS OF WAXY CRUDE OIL
Ralph Simon, Whittier, and Alan H. Beyer, Fullerton, Calif., assignors to Chevron Research Company, San Francisco, Calif.
No Drawing. Filed Jan. 2, 1968, Ser. No. 694,876
Int. Cl. B01j 13/00
U.S. Cl. 252—312                                    3 Claims

ABSTRACT OF THE DISCLOSURE

Disclosed is a method of making oil-in-water emulsions of waxy crude oils for transporting same by use of a surfactant mixture of nonionic surfactants each composed of differing amounts of ethylene oxide in the hydrophilic portions.

---

This invention relates to a process of transporting viscous crude oils and, more particularly, this invention relates to the use of tailored mixtures of surfactants in promoting oil-in-water emulsions to provide easily transportable, low viscosity mixtures of oil and water for handling purposes.

It has been found heretofore that a low viscosity oil-in-water emulsion can be formed from a highly viscous crude. In one process, for example, as disclosed in copending United State application Ser. No. 518,124, now Pat. No. 3,487,844, as table oil-in-water emulsion is created by contacting a viscous crude with water and a base in the presence of emulsifying agent for the crude. Another method using oil-in-water mixtures is disclosed in copending application Ser. No. 599,125, now Pat. No. 3,519,006. That process provides a method for transporting a viscous crude in the form or a low viscosity oil and water mixture which is a relatively stable oil-in-water emulsion dlring movement blt which tends to separate into separate phases when immobile. The emulsion of that invention is prepared by adding a nonionic surfactant to the crude.

While the methods briefly described above have generally been successful, it has been found that certain difficulties still exist when it is desired to handle "waxy" crudes in oil-in-water emulsions. Therefore, there is a need for a method of handling crudes having a high pour point. Typically, the "waxy" crudes have a pour point above the ambient production temperature and when cooled below the pour point they solidify. Generally, "waxy" crudes have pour points above 90° to 100° F. and cause considerable production problems by the wax they deposit in the producing apparatus. Thus, there is need for a method of emulsifying the "waxy" crudes so that they may be more readily moved both in and from the well and on the surface.

In accordance with a broad aspect of the present invention, two or more nonionic surfactants are utilized to promote an oil-in-water emulsion of a "waxy" crude to give desirable characteristics to the mixture. The characteristics of the oil-water system which determine the success of the process include the ability of the mixture to water-wet steel surfaces. Thus, one of the characteristics of the composite surfactant tailored in accordance with the invention is the ability to cause the water in the mixture to preferentially wet steel surfaces such as casings, sucker rods and production or pipeline tubing. Another important characteristic of the composite surfactant of the invention is the ability to form a relatively stable oil-in-water emulsion commensurate with the ability of the emulsion to be easily separated when so desired. Thus the surfactant must posses traits which permit a relatively stable oil-in-water emulsion under certain conditions but which also permit relatively easy separation of the emulsion into separate oil and water phases under other conditions. Another highly desirable characteristic, especially when "waxy" crude is involved, is concerned with the ability of a surfactant to cause a softening of the wax in the oil even at temperatures below the pour point of the oil. Thus some surfactants have the ability to effect a relatively permanent softening of the wax in a waxy crude which allows the crude to be more easily handled even below the pour point of the crude.

In a broad aspect, the composite surfactant of the present invention comprises a combination of two or more surfactants which possess at least some of the desirable characteristics discussed above. For example, a highly desirable composite surfactants includes a mixture of a surfactant having the ability to cause an oil-water mixture to preferentially water-wet steel surfaces and a surfactant which, under certain conditions, will promote a relatively stable oil-in-water emulsion of the crude and which, under other conditions, will permit relatively easy separation of the oil and water into separate phases. The composite surfactant also desirably includes a surfactant, which may be one of the two mentioned above, or which may be a third surfactant which has the ability to soften the wax in a waxy crude, thus permitting easier handling of the crude.

Thus, the present invention contemplates mixing a surfactant having a hydrophilic end and a hydrophobic end which are selected to give relatively stable oil-in-water emulsions and a surfactant having a hydrophilic end and a hydrophobic end which promote water-wetting of steel surfaces. This mixture results in a composite surfactant which, when used to emulsify crudes in water, will give the desirable effects discussed above. If the crude is highly waxy it is also very useful to add to the mixture a surfactant which will soften the wax in the crude at temperatures below the pour point of the crude.

More specifically, in accordance with a broad aspect of the invention, a composite surfactant is formulated of a mixture of a nonionic surfactant having greater than 30 ethylene oxide groups in its hydrophilic end and having a hydrocarbon group containing 8 or more carbon atoms as its hydrophobic end and a nonionic surfactant having between 12 and 8 ethylene oxide groups in its hydrophilic end and having a hydrocarbon group containing 8 or more carbon atoms as its hydrophobic end. The mixture is desirably formed of from 40 to 60 percent of each surfactant to give a composite surfactant in accordance with the invention. If the crude is especially waxy, a surfactant having the ability to soften the wax is also added to the mixture. In this event, the surfactant having 30 or more ethylene oxide groups should be present in the composite mixture in an amount of from 40 to 60 percent. The surfactant having between 12 and 8 ethylene oxide groups should be present in an amount of from 20 to 35 percent and the surfactant having the wax softening ability should be present in an amount of from 10 to 25 percent.

The composite surfactant of the present invention is useful in forming oil-in-water emulsions. The oil-in-water emulsions of the present invention have low viscosities approaching the viscosity of the continuous water phase as contrasted to the highly viscous often immobile unemulsified oil phase. Generally, the oil-in-water emulsion contains from about 50 to 80 or 85 percent oil. The surfactant is usually added to water and then the aqueous surfactant solution is mixed with oil to form an oil-in-water emulsion. The composite surfactant of the present invention is useful in emulsifying oil located downhole in a well with the resulting emulsion being easily pumpable to the surface. The composite surfactant is also useful in forming oil-in-water mixtures for surface transport of the oil such as for example in pipelines, or the like.

It is a particular object of the present invention to provide a composite surfactant useful in promoting oil-in-water emulsions for use in handling highly viscous, high pour point waxy crude oils. Further objects and advantages of the present invention will be apparent from the following detailed description of the present invention.

The composite surfactant is tailored for a particular crude to form an oil-in-water emulsion which retains its advantageous properties during transport either from a well or through a pipeline, but which is easily broken at the end of such transport into separate oil and water phases. The composite surfactant is added to the water in relatively small amounts prior to mixing the aqueous surfactant solution with oil. For example, the surfactant may be added to water in a concentration of as little as about 0.04 percent to as much as about 10 percent or more based on the total water. The water containing the nonionic surfactant is mixed with the oil in a ratio of about 50 to 80-90 percent oil and about 50 to 15-10 percent water. The upper oil-water ratio is limited by the amount of water needed to produce an oil-in-water emulsion suitable for handling. This upper ratio for most surfactants and crude oils is between about 80 to 90 percent oil and 20 to 10 percent water. An oil-in-water emulsion may also be formed at lower oil-water ratios. This is particularly true when the emulsion is formed in a well adjacent to a pump. Thus, any oil-water ratio less than the upper limit for the oil-water ratio which will produce an oil-in-water emulsion may be utilized in accordance with the invention.

Not all surfactants have all the desirable characteristics that produce suitable oil-in-water emulsions for all crudes. This is particularly true when waxy crudes are encountered and it is desired to facilitate the production and handling of a waxy crude at temperatures below its pour point. The characteristics that are particularly important for surfactants to give to an oil-water mixture are: (1) ability to cause water-wetting of steel surfaces by the emulsion; (2) oil-in-water emulsion stability under certain conditions commensurate with (3) ease of oil and water separation under other conditions; and (4) in certain circumstances the ability to soften the wax found in a particularly waxy crude at temperatures below the pour point.

It has been found that surfactants having greater than 30 ethylene oxide groups in their hydrophilic ends and having hydrocarbon groups containing 8 or more carbon atoms at their hydrophobic ends are particularly useful in providing stable oil-in-water emulsions. Sometimes, however, emulsions formed with only this class of surfactants are difficult to break into separate oil and water phases when such is desired. On the other hand, surfactants which give emulsions having desirable characteristics of water-wetting steel surfaces encountered by the emulsion often do not give emulsions of high stability. The water-wetting surfactants are those which have between about 8 and 12 ethylene oxide groups in their hydrophilic ends and which contain 8 or more carbon atoms in the hydrocarbon groups making up their hydrophobic ends. In addition, oil-in-water emulsions formed with surfactants having between 8 and 12 ethylene oxide groups in their hydrophilic ends tend to facilitate separation of the oil-in-water emulsion into separate oil and water phases under certain conditions. Thus, in order to obtain most desirable characteristics in a given oil-in-water emulsion, it is necessary to form a composite surfactant of two or more surfactants capable of imparting these desirable characteristics to the emulsion.

It is particularly desirable that the composite surfactant be formed of a mixture of between 40 and 60 percent each of a surfactant capable of forming a stable oil-in-water emulsion and a surfactant capable of imparting the characteristic of water-wetting of steel surfaces to the emulsion. If particular problems arise because of the extremely waxy nature of the crude, it is also necessary that a surfactant which will soften the wax at temperatures below the pour point be added to the crude. A series of tests may be performed in the laboratory to determine a surfactant which will soften a particular wax below the pour point of the crude. Generally, a surfactant which is useful in this regard will have between 8 and 12 ethylene oxide groups. In a situation where the addition of a surfactant capable of softening the wax of a crude is desirable, the surfactant having 30 or more ethylene oxide groups should be present in the composite mixture in an amount of from 40 to 60 percent. The surfactant imparting the water-wetting characteristic and having between 8 and 12 ethylene oxide groups should be present in an amount of from 20 to 35 percent, and the surfactant having the wax softening ability should be present in an amount of from 10 to 25 percent.

Demonstrations have been conducted on useful surfactants and composite surfactants to facilitate the production and handling of Red Wash crude. The Red Wash crude is a waxy crude and has a pour point in the range of from about 90° to 105° F. The demonstrations involved a number of surfactants individually and in combinations. The surfactants for ease of description will be denominated A, B and C. Surfactant A has the general formula

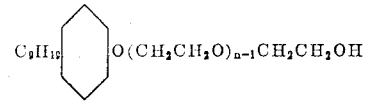

where $n=50$. Surfactant B has the general formula $$C_{13}H_{27}O(CH_2CH_2O)_{n-1}CH_2CH_2OH$$

where $n=10$. Surfactant C has the general formula

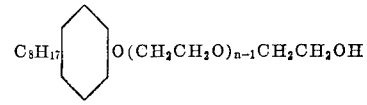

where $n=9$. The various composite surfactants were made up of Surfactants A, B and C and denominated Mix W-1, Mix W-2, Mix W-3. Table I below shows the make up by volume percent of the composite surfactants.

TABLE I.—COMPOSITIONS OF COMPOSITE SURFACTANTS

| Surfactant | Composition, volume percent | | |
|---|---|---|---|
| | Mix W-1 | Mix W-2 | Mix W-3 |
| Surfactant A | 56.5 | 44.0 | 40.0 |
| Surfactant B | 15.5 | 23.5 | 40.0 |
| Surfactant C | 28.0 | 32.5 | 20.0 |

A variety of tests were devised to compare the ability of the surfactants to impart the desirable characteristics as discussed above to an oil-in-water emulsion. These tests were conducted with Red Wash oil and the test procedure used to rate the various surfactants and composite surfactants will now be discussed in detail.

Determination of stability of oil-in-water emulsions

It has been found that an apparently stable oil-in-water emulsion can be inverted into a viscous undesirable water-in-oil emulsion by adding mechanical energy to the oil-in-water emulsion. Therefore, the amount of mechanical or mixing energy required to cause inversion of the oil-in-water emulsion to a water-in-oil emulsion can be used as a measure of the stability of the original oil-in-water emulsion. In the present context, samples of oil-in-water emulsions formed using various surfactants and composite surfactants were recirculated through a positive displacement gear pump. The mixing energy required to invert the emulsion was determined by measuring the number of times that the emulsion could be recirculated before inversion of the emulsion to a water-in-oil emulsion occurred.

In the particular demonstrations conducted with Red Wash oil, the emulsions were prepared from 210 cc. of Red Wash oil and 90 cc. of compounded Red Wash water at a temperature of 120° F. The water contained 0.1 volume percent of the selected surfactant or tailored composite surfactant being tested. The temperature was maintained at 120° F. and the emulsion was circulated through a positive displacement gear pump at a rate of 0.42 passes per second until inversion occurred. An electrical conductivity probe was maintained in the flow stream during pumping to detect the time when inversion occurred. The mixing energy per pass through the pump is theoretically equivalent to a flowing pressure drop of 8 p.s.i.

The results of the tests conducted with Red Wash oil are summarized below in Table II. The most stable emulsion was prepared with Surfactant A and was circulated through the gear pump 630 passes without inverting. The second most stable emulsion was formed with Mix W-2. This emulsion inverted after 480 passes through the pump. The stabilities of the emulsions prepared with the surfactants and the mixtures of surfactants are generally good enough that emulsion stability is not an overly critical factor in the selection of a surfactant or combination of surfactants to facilitate the handling of Red Wash crude. However, when the crude is to be subjected to a great deal of handling or pipelining through one or more pump stations, it is highly desirable that the emulsion be stable under rigorous conditions and, therefore, only the better surfactants and mixtures as shown in Table II should be used.

TABLE II

Stability of 70/30 Red Wash O/W Emulsions at 120° F. (surfactant concentration=0.1 volume percent of water phase).

| Surfactant in water phase: | Number of passes through gear pump required to cause inversion |
|---|---|
| None | 135 |
| Surfactant A | 630 |
| Surfactant B | 400 |
| Surfactant C | 220 |
| Mix W-1 | 360 |
| Mix W-2 | 480 |
| Mix W-3 | 310 |

Determination of ability of surfactant to water-wet steel surfaces

The ability of aqueous surfactant solutions to displace Red Wash oil from steel surfaces at 120° F. was determined. In these tests 20 grams of 1/16″ diameter steel balls were placed in a Bacock test bottle and were saturated with 1.5 cc. of Red Wash oil. The test bottle was then filled with tap water (approximately 35 cc.) containing 0.02 volume percent of the surfactant or composite surfactant being tested. The bottles were maintained at 120° F. while being centrifuged at low speed (less than 75 G's) for periods of 30 seconds. The centrifuging procedure was arbitrarily selected to cause most, but not all, of the oil to be displaced from the steel balls in a reasonable period of time. The volume of displaced oil which collected in the calibrated necks of the Babcock bottles gave a measure of the relative ability of surfactant solutions to water-wet a steel surface.

The significant results of these tests are summarized below in Table III. The most effective single surfactant for displacing oil from the steel balls was Surfactant C. Equally effective was composite surfactant Mix W-2 which was the most favorable combination tested. It is noted that all three of the composite surfactants wetted the steel surface better than did Surfactant A.

TABLE III

Displacement of Red Wash oil from a steel surface at 120° F. (surfactant concentration=0.02 volume percent of water phase)

| Surfactant in water phase: | Percent of oil displaced after centrifuging for 30 seconds |
|---|---|
| None | 49 |
| Surfactant A | 80 |
| Surfactant B | 90 |
| Surfactant C | 95 |
| Mix W-1 | 90 |
| Mix W-2 | 95 |
| Mix W-3 | 93 |

Determination of surfactant ability to soften crude at temperatures below pour point The ability of different surfactants to soften Red Wash crude oil at temperatures below its 90° to 105° F. pour point was determined. This characteristic of softening the wax at temperatures below the pour point of the oil is important in unheated flow lines and would be of assistance in restarting waxy oil flow after a shutdown. A 50/50 mixture of Red Wash crude oil and compounded Red Wash water was prepared at 120° F. The water contained 0.1 volume percent of the surfactant or the composite surfactant being tested. The mixture was stirred with an electric stirrer and allowed to cool while stirring was continued until it began to solidify. The mixture was then allowed to cool to room temperature undisturbed. After standing at room temperature, which was approximately 70° F. for from 15 to 20 hours, the oil was visually and physically examined for degree of softness by probing with a glass rod. The qualitative results are summarized in Table IV. The softest Red Wash crude obtained by using Surfactant B alone had a texture much like that of whipped margaine. The results with Mix W-2, the best of the mixtures examined, were substantially better than those using SurfactantA or Surfactant C alone.

TABLE IV

Softening of Red Wash crude at temperatures below its pour point (surfactant concentration=0.1 volume percent of water phase)

| Surfactant in water phase: | Oil softening ability |
|---|---|
| None | Poorest. |
| Surfactant A | Poor. |
| Surfactant B | Best. |
| Surfactant C | Poor. |
| Mix W-1 | Fair. |
| Mix W-2 | Good |
| Mix W-3 | Poor. |

Determination of oil-water separation into separate phases

Separate tests to determine the effect of the various surfactants and composite surfactants on the residual water content of Red Wash crude oil were conducted. The ability to separate the oil-in-water emulsion into separate phases under certain conditions is an important corollary to the function of the surfactant or composite surfactant to achieve a stable oil-in-water emulsion under other conditions. The procedures and the results of these tests are given in the footnotes below Table V. No significant differences were observed in the residual water content of the oil phase after separation from emulsions formed using Surfactant A, Surfactant B or Surfactant C alone. Overall, better water separation was obtained using any of the three composite surfactant mixes, Mix W-1, Mix W-2 and Mix W-3, than with the individual surfactants. Of the composite surfactants tested, Mix W-1 provided the lowest average residual water cut.

TABLE V.—WATER SEPARATION FROM RED WASH CRUDE OIL

| Surfactant in water phase | Residual water content of oil phase after separation, percent | | | | | |
|---|---|---|---|---|---|---|
| | Run 1 [a] | Run 2 [b] | Run 3 [c] | Run 4 [d] | Run 5 [e] | Avg. [f] |
| Surfactant A | 3.7 | 3.0 | 6.0 | 3.5 | 6.5 | 4.8 |
| Surfactant B | 3.5 | | | | | |
| Surfactant C | 3.5 | | | | | |
| Mix W-1 | | 2.5 | 4.0 | 3.9 | 3.5 | 3.5 |
| Mix W-2 | | 2.4 | 4.0 | 3.7 | 6.5 | 4.2 |
| Mix W-3 | | 2.6 | 3.2 | 3.8 | 6.5 | 4.0 |

[a] A 50/50 mixture of Red Wash oil and tap water was mixed lightly at 120° F. and allowed to separate as it cooled to room temperature. The surfactant concentration in the water was 0.2 percent by volume.
[b] A 50/50 mixture of Red Wash oil and Red Wash water was mixed lightly at 120° F. and placed in a 160° F. bath for two hours to separate. The surfactant concentration in the water was 0.1 volume percent.
[c] The same conditions existed as in (b), except the oil-water mixture was hand shaked vigorously for five minutes before separation.
[d] The same conditions existed as in (b), except the oil-water mixture was stirred with an electric stirrer for ten minutes before separation.
[e] The same conditions existed as in (b), except the oil-water mixture was stirred with an electric stirrer for 20 minutes before separation.
[f] These are the average values of (v), (c), (d) and (e) for purposes of comparing the results of the surfactant combinations with those of Surfactant A.

The relative performance rating of Surfactant A, the surfactant heretofore used in the Red Wash field, and the composite surfactants in each characteristic of the oil-water system is set out below in Table VI. It is noted that the best performance over-all was obtained with Mix W-2. On the average, all three mixtures, Mix W-1, Mix W-2 and Mix W-3 performed better than Surfactant A.

TABLE VI.—RELATIVE PERFORMANCE OF COMPOSITE SURFACTANTS AND SURFACTANT A

| Characteristic of oil-water system | Relative performance rating | | | |
|---|---|---|---|---|
| | Surfactant A | Mix W-1 | Mix W-2 | Mix W-3 |
| Water-wetting of steel surfaces | 4 | 3 | 1 | 2 |
| Oil-in-water emulsion stability | 1 | 3 | 2 | 4 |
| Wax softening | 3-4 | 2 | 1 | 3-4 |
| Oil-water separation | 4 | 1 | 3 | 2 |

Based on the results of these tests, the preferred composite surfactant for use with a waxy crude of the Red Wash type comprises about 40 to 60 percent of a surfactant having the general formula

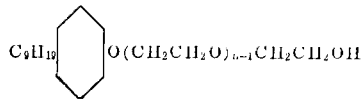

where $n$ is a whole number from 40 to 100; 10 to 25 percent of a surfactant having the general formula $$C_{13}H_{27}O(CH_2CH_2O)_{n-1}CH_2CH_2OH$$

where $n$ is a whole number from 8 to 12; and 25 to 35 percent of a surfactant having the general formula

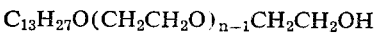

where $n$ is a whole number from 8 to 12. Any mixture which results in an oil-in-water emulsion may be used. Generally, this is the case when at least 20 percent water containing the composite surfactant is present. Usually it is desirable to have additional water. The composite surfactant described above should be present in the water solution in amounts ranging from about 0.02 volume percent to 5.0 volume percent. It is preferred that the water contain at least 0.1 volume percent of the composite surfactant.

The most highly preferred composite surfactant for use with waxy crude of the Red Wash type is the composite surfactant Mix W-2 and comprises about 44.0 volume percent of a surfactant having the formula

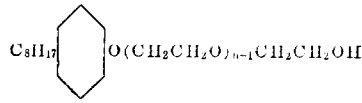

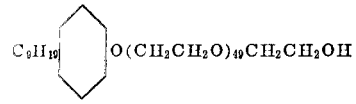

23.5 volume percent of a surfactant having the formula $C_{13}H_{27}O(CH_2CH_2O)_9CH_2CH_2OH$; and 32.5 volume percent of a surfactant having the formula

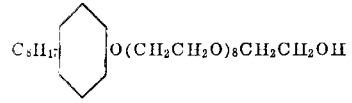

This composite surfactant is mixed with water in an amount of at least 0.02 volume percent and preferably in an amount of at least 0.1 volume percent. The aqueous surfactant solution is then mixed with oil. The amount of aqueous surfactant solution is sufficient to give an oil-in-water emulsion. This amount is usually at least 20 percent of the total mixture.

Although specific embodiments of the present invention have been described, the invention is not to be limited to only these embodiments but rather only by the scope of the appended claims.

What is claimed is:

1. The method of forming an oil-in-water emulsion of a waxy crude comprising mixing with the oil and water a composite surfactant comprising 40 to 60 percent of a surfactant having the general formula

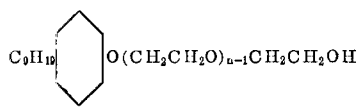

where $n$ is a whole number of from 40 to 100; 10 to 25 percent of a surfactant having the general formula $C_{13}H_{27}O(CH_2CH_2O)_{n-1}CH_2CH_2OH$ where $n$ is a whole number of from 8 to 12; and 25 to 35 percent of a surfactant having the general formula

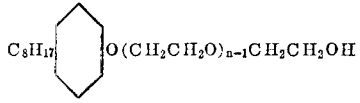

where $n$ is a whole number of from 8 to 12.

2. The method of forming an oil-in-water emulsion of a waxy crude comprising mixing with oil an aqueous solution containing a composite surfactant comprising a first nonionic surfactant having a general formula

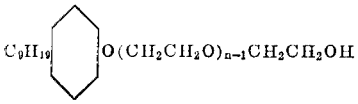

where $n$ equals 50 and a nonionic second surfactant selected from the group consisting of surfactants having the general formula

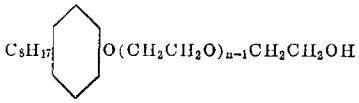

where $n$ equals 9 and $C_{12}H_{27}O(CH_2CH_2O)_{n-1}CH_2CH_2OH$ where $n$ equals 10, where each of said first and second surfactants forms 40 to 60 percent of said composite surfactant and said composite is in a concentration of from 0.04 volume percent to 10.0 volume percent based on total water.

3. The method of improving mobility of a waxy crude comprising mixing with a waxy crude water containing a composite surfactant in solution therewith, said composite surfactant comprising a first nonionic surfactant having a general formula

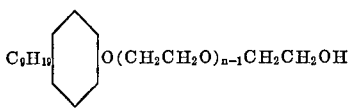

where *n* equals 50 and a second surfactant selected from the group consisting of surfactants having the general formula

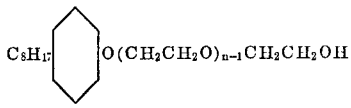

where *n* equals 9 and $C_{13}H_{27}O(CH_2CH_2O)_{n-1}CH_2CH_2OH$ where *n* equals 10, where each of said first and second surfactants forms 40 to 60 percent of said composite surfactant and said composite surfactant is in a concentration of from 0.04 volume percent to 10.0 volume percent based on total water.

References Cited
UNITED STATES PATENTS

| | | | |
|---|---|---|---|
| 2,819,996 | 1/1958 | Riley | 252—312 |
| 2,927,078 | 3/1960 | Nathan | 252—8.3 |
| 3,282,843 | 11/1966 | Alburger | 252—8.3 |

JOHN D. WELSH, Primary Examiner

U.S. Cl. X.R.

252—8.5 P, 8.3, 351